United States Patent
Nerome et al.

(10) Patent No.: US 8,826,224 B2
(45) Date of Patent: Sep. 2, 2014

(54) APPARATUS AND METHOD FOR SUPPORTING MODEL-DRIVEN DEVELOPMENT

(75) Inventors: Takashi Nerome, Yokohama (JP); Yuriko Sawatani, Machida (JP); Toyotaro Suzumura, Tokyo (JP); Kaori Fujiwara, Kawasaki (JP)

(73) Assignee: International Business Machines Corporation, Armonk, NY (US)

(*) Notice: Subject to any disclaimer, the term of this patent is extended or adjusted under 35 U.S.C. 154(b) by 1904 days.

(21) Appl. No.: 12/103,980

(22) Filed: Apr. 16, 2008

(65) Prior Publication Data

US 2008/0263510 A1    Oct. 23, 2008

(30) Foreign Application Priority Data

Apr. 18, 2007  (JP) ................. 2007-109181

(51) Int. Cl.
G06F 9/44        (2006.01)
(52) U.S. Cl.
CPC . *G06F 8/355* (2013.01); *G06F 8/10* (2013.01); *G06F 8/20* (2013.01)
USPC .......................... 717/104; 717/106; 717/110
(58) Field of Classification Search
CPC ............................................. G06F 8/10–8/355
USPC ............... 717/101–178; 707/E17.122; 703/6; 719/316
See application file for complete search history.

(56) References Cited

U.S. PATENT DOCUMENTS

| | | | |
|---|---|---|---|
| 6,018,627 A * | 1/2000 | Iyengar et al. | 717/103 |
| 6,502,239 B2 * | 12/2002 | Zgarba et al. | 717/168 |
| 6,678,882 B1 * | 1/2004 | Hurley et al. | 717/121 |
| 6,851,105 B1 * | 2/2005 | Coad et al. | 717/106 |
| 6,851,107 B1 * | 2/2005 | Coad et al. | 717/108 |
| 6,904,588 B2 * | 6/2005 | Reddy et al. | 717/104 |

(Continued)

FOREIGN PATENT DOCUMENTS

| | | |
|---|---|---|
| JP | 04-54558 | 2/1992 |
| JP | 05-241802 | 9/1993 |
| JP | 11-191063 | 7/1999 |
| JP | 2006-268764 | 10/2006 |

OTHER PUBLICATIONS

NPL—(Merging graph-like object structures; Zündorf, Wadsack and Rockel; Technical University of Braunschweig Institute for Software and Department of Mathematics and Computer Science University of Paderborn—Apr. 4, 2001).*

(Continued)

*Primary Examiner* — Lewis A Bullock, Jr.
*Assistant Examiner* — Francisco Aponte
(74) *Attorney, Agent, or Firm* — Cantor Colburn LLP; Preston Young

(57) ABSTRACT

In a model editing apparatus, a model transformation function transforms SM (source model) 0 into TM (target model) 0, and generates TDM (transformation dependency model) 0. Moreover, when an SM editor generates SM1 by updating SM0, the model transformation function transforms SM1 into TM1 and generates TDM1. When a TM editor generates TM0_n by editing TM0 independently of the change in SM0, a Change element registration function registers a difference Δ2 between TM0 and TM0_n in TDM0, thereby generating TDM0_n. Then, in response to a call, a merge function merges a difference Δ1 between TDM0 and TDM1 extracted by a Δ1 extraction function, and a difference Δ2 extracted from TDM0_n, according to prestored processing patterns.

14 Claims, 14 Drawing Sheets

(56) References Cited

U.S. PATENT DOCUMENTS

| | | | |
|---|---|---|---|
| 7,412,366 B1* | 8/2008 | Englehart et al. | 703/6 |
| 7,509,629 B2* | 3/2009 | Sakamoto et al. | 717/105 |
| 7,680,805 B2* | 3/2010 | Rusch | 717/104 |
| 7,703,027 B2* | 4/2010 | Hsu et al. | 715/763 |
| 7,734,457 B2* | 6/2010 | Deffler | 703/13 |
| 7,761,844 B2* | 7/2010 | Bove et al. | 717/106 |
| 7,788,636 B2* | 8/2010 | Nakamura et al. | 717/104 |
| 7,856,621 B2* | 12/2010 | Plante | 717/122 |
| 7,861,214 B2* | 12/2010 | Amsden et al. | 717/104 |
| 8,166,449 B2* | 4/2012 | Jazdzewski | 717/100 |
| 2004/0034846 A1* | 2/2004 | Ortal et al. | 717/111 |
| 2005/0261787 A1* | 11/2005 | Plante | 700/30 |
| 2006/0064667 A1* | 3/2006 | Freitas | 717/104 |
| 2006/0130011 A1* | 6/2006 | Cornell et al. | 717/136 |
| 2006/0168183 A1* | 7/2006 | Fuller et al. | 709/223 |
| 2006/0206865 A1* | 9/2006 | Reinhardt et al. | 717/108 |
| 2006/0225030 A1* | 10/2006 | Deffler | 717/104 |
| 2007/0067761 A1* | 3/2007 | Ogilvie et al. | 717/146 |
| 2007/0112878 A1* | 5/2007 | Bennett et al. | 707/201 |
| 2007/0168922 A1* | 7/2007 | Kaiser | 717/104 |
| 2008/0235656 A1* | 9/2008 | Hui et al. | 717/104 |

OTHER PUBLICATIONS

NPL—(Merging Models with the Epsilon Merging Language (EML); Kolovos, Paige and Polack; Department of Computer Science, The University of York, UK, York, YO10 5DD—Aug. 9, 2006).*

NPL—(Merging graph-like object structures; Zendorf, Wadsack and Rockel; Technical University of Braunschweig Institute for Software and Department of Mathematics and Computer Science University of Paderborn—Apr. 4, 2001 ).*

NPL—(Model Comparison: A Foundation for Model Composition and Model Transformation Testing; Kolovos, Paige and Polack; Proceedings of the 2006 international workshop on Global integrated model management—Mar. 15, 2006).*

Letkeman, "Comparing and merging UML models in IBM Rational Software Architect Part 1", Jul. 12, 2005 [http://www-128.ibm.com/developerworks/rational/library/05/712_comp/].

Letkeman, "Comparing and merging UML models in IBM Rational Software Architect Part 2", Jul. 12, 2005 [http://www-128.ibm.com/developerworks/rational/library/05/712_comp2/].

* cited by examiner

```
package com.ibm.mdbt.codeGen.Assumption.client;

import java.util.*;
import javax.naming.*;
import java.util.ResourceBundle;
import javax.rmi.PortableRemoteObject:
import com.ibm.mdbt.codeGen.Assumption.session.*;

public class AssumptionUtility {
public static AssumptionServiceLocal serviceBean = null;

public static void initServiceBean(){
try{
InitialContext initCtx = new InitialContext();
AssumptionServiceLocalHome serviceBeanHome =
(AssumptionServiceLocalHome)initCtx. lookup("java:comp/env/ejb/AssumptionService");
serviceBean = serviceBeanHome.create();
}
catch(NamingException ex ){
ex.printStackTrace() ;
}
catch(Exception ex){
ex.printStackTrace() ;
}
}
/**
*@return
*/
public static AssumptionServiceLocal getServiceBean() {
if(serviceBean==null){
initServiceBean();
}
return serviceBean;
} public static String getDisplayLable(String key){
ResourceBundle myResources = ResourceBundle.getBundle("AssumptionDisplayText");
String returnVal = "";
try{
returnVal = (String)myResources.getObject(key);
}
catch(Exception e){
System.out.println("ERROR: " + key + " can't be found in the properties file");
return"";
}
return returnVal;
}
}
```

FIG. 2-1

```
package com.ibm.mdbt.codeGen.Assumption.client;

import java.util.*;
import javax.naming.*;
import java.util.ResourceBundle;
import javax.rmi.PortableRemoteObject;
import com.ibm.mdbt.codeGen.Assumption.session.*;

public class AssumptionUtility {
public static AssumptionServiceLocal serviceBean = null;                     ⌐101 public static void initServiceBean(){
try{
InitialContext initCtx = new InitialContext();
NewAssumptionServiceLocalHome serviceBeanHome =
(NewAssumptionServiceLocalHome)initCtx. lookup("java:comp/env/ejb/NewAssumptionService");
serviceBean = serviceBeanHome.create();
}
catch(NamingException ex ){
ex.printStackTrace() ;
}
catch(Exception ex){
ex.printStackTrace() ;
}
}

/**
*@return
*/
public static AssumptionServiceLocal getServiceBean() {
if(serviceBean==null){
initServiceBean();
}
return serviceBean;
}                                                                           ⌐102 public static String getDisplayLable(String key){
ResourceBundle myResources = ResourceBundle.getBundle("NewAssumptionDisplayText");
String returnVal = "";
try{
returnVal = (String)myResources.getObject(key);
}
catch(Exception e){
System.out.println("ERROR: " + key + " can't be found in the properties file");
return"";
}
return returnVal;
}
}
```

FIG. 2-2

```
package com. ibm.mdbt.codeGen.Assumption.client;

import java.util.*;
import javax.naming.*;
import java.util.ResourceBundle;
import javax.rmi PortableRemoteObject:
import com.ibm.mdbt.codeGen.Assumption.session.*;

public class AssumptionUtility {
public static AssumptionServiceLocal serviceBean = null;                  ⎫ 103
```

```
public static void initServiceBean(){
try{
InitialContext initCtx = new InitialContext();
AssumptionServiceLocalHome serviceBeanHome =
(AssumptionServiceLocalHome)initCtx. lookup("java:comp/env/ejb/AssumptionService");
serviceBean = serviceBeanHome.create();
serviceBean = newProcess();
}
catch(NamingException ex ){
ex.printStackTrace() ;
}
catch(Exception ex){
ex.printStackTrace() ;
}
}
```

```
/**
*@return
*/
public static AssumptionServiceLocal getServiceBean() {
if(serviceBean==null){
initServiceBean();
}
return serviceBean;
}                                                                         ⎫ 104
```

```
public static String getDisplayLable(String key){
ResourceBundle myResources =
ResourceBundle.getBundle("AssumptionDisplayTextForCommonPage");
String returnVal = "";
try{
returnVal = (String)myResources.getObject(key);
}
catch(Exception e){
System.out.println("ERROR: " + key + " can't be found in the properties file");
return"";
}
return returnVal;
}
}
```

FIG. 2-3

```xml
<?xml version="1.0" encoding="UTF-8"?>
<DependencyModel id="dm001" creationDate="200703081220" , modificationDate="200704021201">

<DependencyGroup resourceType="java" id="dg1" >
  <Dependency id="d1" filePath="fileA.java">
    <Mapping id="m001" strengthType="H" , value="Assumption" >
      <SourceModelPath id="smp001" path="Parent/ChildA [@name] ">
      </SourceModelPath>
      <TargetModelPath id="tmp001" scope="elementOnly" path= "ClassA##method" suffix="View"  >
      </TargetModelPath>
    </Mapping>
    <Mapping id="m002" strengthType="L" , value="ItemA">
      <SourceModelPath id="smp002" path=" Parent/ChildB [@name] ">
      </SourceModelPath>
      <TargetModelPath id="tmp002" scope="elementOnly" path="ClassA##field" suffix="View" />
      <Change changedType= "delete" changedDateTime="200704011102" />
    </Mapping>
  </Dependency>
</DependencyGroup>

<InputModels transformationType="MDBT Transformation" >
  <SourceModel modelType="XML" filePath= " C : \\MDCM\\SampleModel.xml " >
  </SourceModel >
  <TargetModel modelType="Java" filePath="C : \\MDCM\\SampleCode.java">
  </TargetModel >
</InputModels >

</DependencyModel>
```

FIG. 5

DEPENDENCY STRENGTH H

(a)

| Δ1 \ Δ2 | Update | Delete |
|---|---|---|
| Update | Update (INVALIDATE Δ2) | Add |
| Delete | Delete | NOP |

DEPENDENCY STRENGTH M

(b)

| Δ1 \ Δ2 | Update | Delete |
|---|---|---|
| Update | NOP | Add |
| Delete | Delete | NOP |

DEPENDENCY STRENGTH L

(c)

| Δ1 \ Δ2 | Update | Delete |
|---|---|---|
| Update | NOP | NOP |
| Delete | NOP | NOP |

DEPENDENCY STRENGTH N

(d)

| Δ1 \ Δ2 | Update | Delete |
|---|---|---|
| Update | MERGE PROCESSING BY TM EDITOR | MERGE PROCESSING BY TM EDITOR |
| Delete | MERGE PROCESSING BY TM EDITOR | NOP |

FIG. 10

APPARATUS AND METHOD FOR SUPPORTING MODEL-DRIVEN DEVELOPMENT

CROSS-REFERENCE TO RELATED APPLICATIONS

This application claims priority under 35 U.S.C. §119 to Japan Patent Application No. 2007-109181 filed Apr. 18, 2007, the entire content of which is specifically incorporated by reference herein.

BACKGROUND OF THE INVENTION

1. Field of the Invention

The present invention relates to an apparatus and method for supporting model-driven development. In particular, the present invention relates to an apparatus and method for merging changes in a model in model-driven development.

2. Description of Related Art

In a collaborative development environment where multiple developers are engaged in development of the same application, since the developers individually change the application, it is important to merge differences in the application resulting from the individual changes in the application. Heretofore, such merging is carried out by use of a function in a tool, such as Concurrent Versions System (CVS) and Rational (registered trademark), of extracting a difference between source codes.

Today, an activity called modeling of writing a model used as an application design chart is carried out in order to smoothly progress application development. One of typical modeling languages used for such modeling is the Unified Modeling Language (UML). The UML has been standardized by the Object Management Group (OMG), and is a modeling language that can be called a de facto standard in object-oriented application development. Since the flow and functions of an application are expressed in a diagram by use of the UML, the UML can provide a visually and easily understandable model.

Heretofore, the extracting of a difference between two or three UML models directly edited by the respective developers has been carried out (see Kim Letkeman, "Comparing and merging UML models in IBM Rational Software Architect," [online], 12 Jul. 2005 [searched on 9 Apr. 2007], Internet <URL:http://www-128.ibm.com/developerworks/rational/librar y/05/712_comp/> and <URL:http://www-128.ibm-.com/developerworks/rational/librar y/05/712_comp2/>). According to Kim Letkeman, "Comparing and merging UML models in IBM Rational Software Architect," [online], 12 Jul. 2005 [searched on 9 Apr. 2007], Internet <URL:http://www-128.ibm.com/developerworks/rational/librar y/05/712_comp/> and <URL:http://www-128.ibm.com/developerworks/rational/librar y/05/712_comp2/>, a difference is extracted by use of the Eclipse compare support tool.

Moreover, there is also a known technique using a model editing system allowing application software to be dialogically created by use of a model to be edited and a view model that displays the model in a certain format. According to this technique, when the structure of the model is changed, the model and the view model can be efficiently synchronized with each other (for example, see Japanese Patent Application Laid-open Publication No. 2006-268764).

In application development in recent years, challenges for many developers are to shorten a development period and to reduce development costs. In this regard, the OMG provides the Model Driven Architecture for model-centered development of an application. This Model Driven Architecture is architecture that enables models in multiple modeling environments to be tied up through model transformation. The Model Driven Architecture is composed of three-layered logic models of a computational independent model (CIM), a platform independent model (PIM) and a platform specific model (PSM). Here, the CIM is a model, such as a business process, for example, that is independent of operations on a computer. The PIM is a model independent of a platform. The PSM is a model specific to a platform, for example, a model of J2EE (Java 2 Enterprise Edition) (Java and other trademarks containing Java are registered trademarks and trade names of Sun Microsystems, Inc. in the United States and other countries). A mechanism for transforming a highly abstract model into implementation codes full-automatically or semi-automatically can be obtained by employing the model-driven development with the Model Driven Architecture. This allows workload required for development to be reduced and a developed application to be easily ported into a different environment or a platform.

However, when the model-driven development is actually carried out, a model defined in an upper layer needs to be considered as one to be changed inevitably. In addition, a model defined in a lower layer is naturally customized or modified independently of a change in the model in the upper layer.

More specifically, when a model that is a base for generation (source model) is updated, the model has a difference from the model before update. In this state, if a model transformation is carried out at a certain time point, the difference in the source model makes an impact on a model generated based on the source model (target model). For example, here, consider what kind of impact an addition of one model element in response to a change request in the PIM level makes on codes in the PSM level that have been automatically generated before the addition. The Model Driven Architecture has a feature of transferring information on an upper model to a lower model as "a specification," if possible. Accordingly, one change in the upper model may make many impacts on the lower model.

Moreover, in some cases, a model and codes already generated through the model transformation are edited in response to a change request or the like in each level (PIM or PSM).

In this case, the problem is how to merge the impacts from the upper model and the editing in the lower model.

The model transformation in the model-driven development is effective in the sense of generating a first edition of a target model. However, a method has not yet been developed for managing many changes in response to repeated change requests when the model-driven development is applied to actual application development. As a result, in many cases, the application of the model-driven development results in an increase of entire costs as compared with a case where the model-driven development is not applied.

In this case, the problematic point is a state in which an upper model and a lower model are changed independently. However, the technique of Kim Letkeman, "Comparing and merging UML models in IBM Rational Software Architect," [online], 12 Jul. 2005 [searched on 9 Apr. 2007], Internet <URL:http://www-128.ibm.com/developerworks/rational/librar y/05/712_comp/> and <URL:http://www-128.ibm-.com/developerworks/rational/librar y/05/712_comp2/> has not been developed based on the premise of such a state.

In addition, the invention of Japanese Patent Application Laid-open Publication No. 2006-268764 cannot solve the foregoing problem because the invention mainly focuses on the synchronization of the view model and the model with each other.

SUMMARY OF THE INVENTION

An object of the present invention is to enable a change in a target model attributed to an update of a source model and an independent change of the target model to be efficiently merged.

In order to achieve the object, in the present invention, a change in the target model attributed to an update of a source model, and an independent change in the target model are merged according to priority between these changes. More specifically, the present invention provides an apparatus for supporting model-driven development. The apparatus of the present invention includes a first obtaining unit, a second obtaining unit and a merge unit. The first obtaining unit obtains first change information on a first change from among changes in a target model generated based on a source model in the model-driven development, the first change attributed to an update of the source model. The second obtaining unit obtains second change information on a second change from among the changes in the target model, the second change not attributed to the update of the source model. The merge unit merges the first change information and the second change information according to presorted information on priority between the first change and the second change.

In addition, the apparatus may further include a storage unit for storing a first structured document and a second structured document therein. The first structured document indicates a correspondence relationship between an element in the source model before the update of the source model and an element in the target model. The second structured document indicates a correspondence relationship between the element in the source model after the update of the source model, and the element in the target model. As the first change information, the first obtaining unit may obtain a difference between the first structured document and the second structured document.

In addition, this apparatus may further include a storage unit for storing a correspondence relationship among a first element constituting the source model, a second element constituting the target model, and a third element indicating a change of the second element. The second obtaining unit may obtain the second change information by extracting the third element from the correspondence relationship.

Further, the information on the priority may include a condition for prioritizing the first change over the second change in merging, and may include information indicating a command to inquire of a user whether or not to prioritize the first change over the second change in merging.

Furthermore, the information on the priority may include a plurality of rules relating to merge processing, and the plurality of rules may be each specified by an identifier. In this case, this apparatus may further include a storage unit for storing therein information on a correspondence of each element constituting the target model to an identifier. According to a rule specified by the identifier, the merge unit may merge change information on a change of the element in the first change information, and change information on a change of the element in the second change information.

Moreover, the present invention also provides a method for supporting model-driven development. The method includes the steps of: transforming a first source model into a first target model; generating a second source model by updating the first source model; transforming the second source model into a second target model; generating a third target model by independently changing the first target model regardless of the update of the first source model; and merging first change information on a first change and second change information on a second change according to prestored information on priority between the first change and the second change, the first change being the change from the first target model to the second target model, and the second change being the change from the first target model to the third target model.

In addition, the present invention provides a program allowing a computer to function as an apparatus for supporting model-driven development. The program allows the computer to function as a first obtaining unit, a second obtaining unit and a merge unit. The first obtaining unit obtains first change information on a first change from among changes in a target model generated based on a source model in the model-driven development, the first change attributed to an update of the source model. The second obtaining unit obtains second change information on a second change from among the changes in the target model, the second change not attributed to the update of the source model. The merge unit merges the first change information and the second change information according to presorted information on priority between the first change and the second change.

BRIEF DESCRIPTION OF THE DRAWINGS

For a more complete understanding of the present invention and the advantage thereof, reference is now made to the following description taken in conjunction with the accompanying drawings.

FIG. 2-1 is an example of source code as a target model in the embodiment of the present invention.

FIG. 2-2 is an example of source code as a target model in the embodiment of the present invention.

FIG. 2-3 is an example of source code as a target model in the embodiment of the present invention.

FIG. 3 is a diagram for describing generation of a TDM according to the embodiment of the present invention.

FIG. 5 is a diagram showing a description example of a TDM according to the embodiment of the present invention.

FIGS. 10A to 10D show examples of processing pattern tables according to the embodiment of the present invention.

DETAILED DESCRIPTION OF THE PREFERRED EMBODIMENT

Hereinafter, the best modes (hereinafter, called embodiments) for carrying out the invention will be described in detail by referring to the accompanying drawings.

Figure 1:
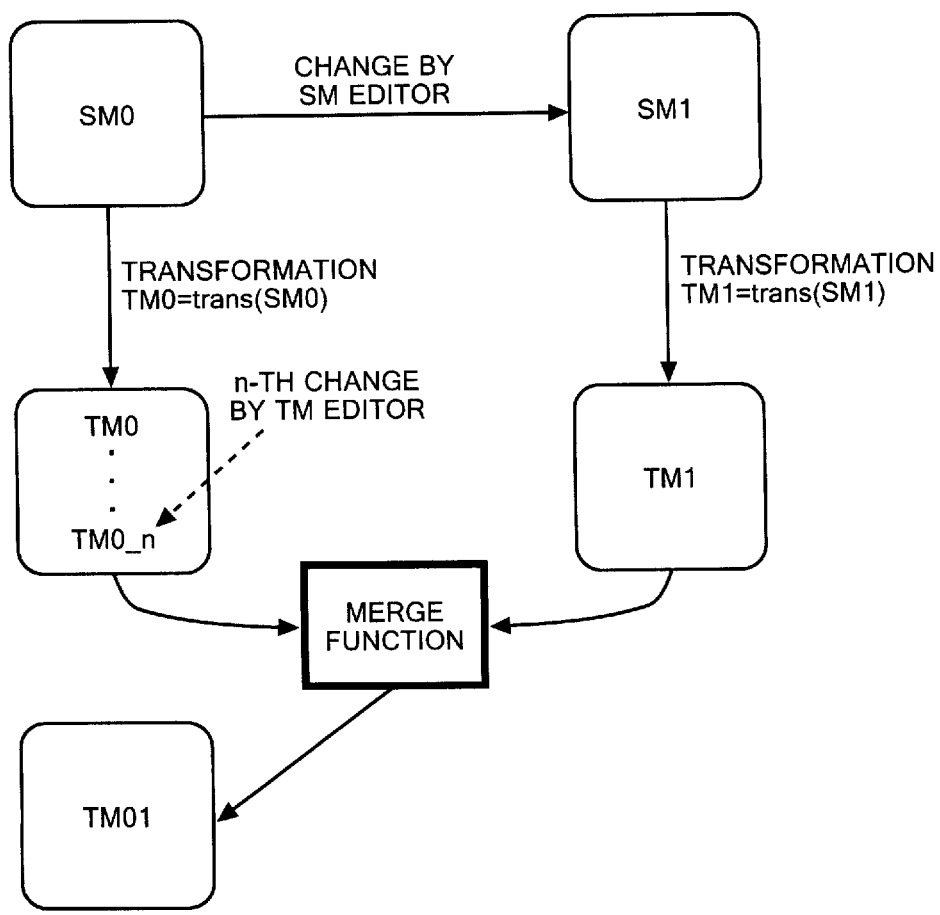
FIG. 1 is a diagram for describing editing and merging in an embodiment of the present invention.

FIG. 1 is a diagram showing a source model that is an input for a model transformation, a target model that is an output of the model transformation, and processes of changing each model and merging the models. The source model and the target model resulting from the first model transformation are denoted by SM0 and TM0, respectively. In addition, SM1 denotes the source model obtained when a person in charge of editing the source model (called an SM editor, below) changes SM0, and TM1 denotes the target model obtained through the model transformation of SM1. Moreover, TM0_n denotes the target model obtained through the n-th change of TM0 by a person in charge of editing the target model (called a TM editor, below).

Here, When TM01 that is the latest target model is generated from TM1 and TM0_n, it is necessary to merge changes in the target model, one of the changes attributed to a change by the SM editor, and the other of changes made by the TM editor.

In this description, Δ1 denotes a difference between the target model of the first edition and the target model resulting from the former change, and Δ2 denotes a difference between the target model of the first edition and the target model resulting from the latter change. In FIG. 1, the difference between TM0 and TM1 corresponds to Δ1, and the difference between TM0 and TM0_n corresponds to Δ2.

The source model and the target model may be models at any levels in the Model Driven Architecture, as long as the source model is superior to the target model. Here, Δ1 and Δ2 are explained by taking source code as an example of the target model.

Figure 3:
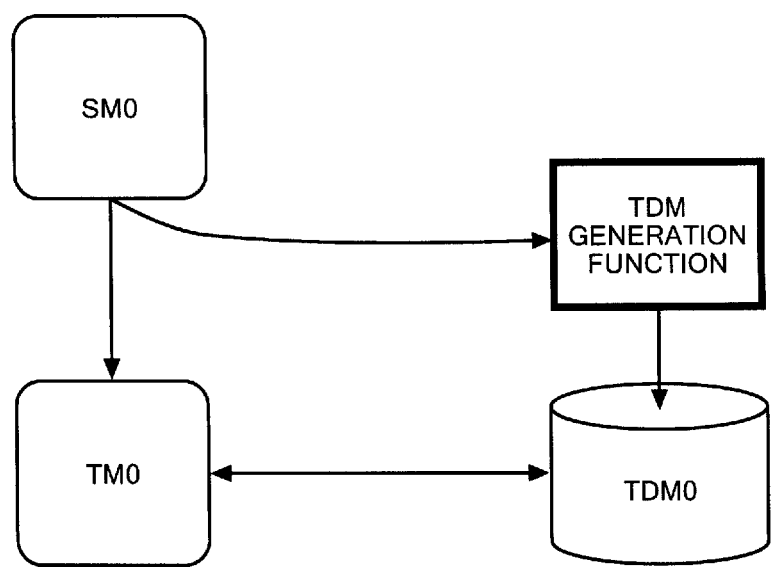

FIG. 2-1 shows an example of TM0, FIG. 2-2 shows an example of TM1, and FIG. 2-3 shows an example of TM0_1.

More precisely, the source code in FIG. 2-2 is source code newly generated as a result of a change in a model that is a base for the source code in FIG. 2-1 by the SM editor. In FIG. 2-2, the source code is changed as underlined in methods 101 and 102. In this case, these methods 101 and 102 correspond to Δ1.

Moreover, the source code in FIG. 2-3 is source code obtained through the first editing of the source code in FIG. 2-1 by the TM editor. In FIG. 2-3, the source code is changed as underlined in methods 103 and 104. In this case, these methods 103 and 104 correspond to Δ2.

Incidentally, it is possible to extract differences in source code by use of the existing CVS, Eclipse comparing support tool or some other tool. However, the thus extracted differences mixedly include Δ1 and Δ2, the former of which is a difference based on a change in the source model, and the latter of which is a difference in the target model level. In contrast to them, in this embodiment, Δ1 and Δ2 are distinctly handled and are easily merged without errors.

More specifically, in model-driven development, a transformation dependency model (simply abbreviated as "TDM" below) is generated, and Δ1 and Δ2 are extracted and merged by use of the TDM.

First of all, generation of a TDM will be explained.

FIG. 3 is a diagram illustrating an example of the position of the TDM in the model transformation. The TDM may be generated by a TDM generating function, for example, included in the model transformation tool or the like. FIG. 3 shows a state in which a model transformation of SM0 into TM0 is performed, thereby generating TDM0 that is a TDM corresponding to this model transformation.

Here, the TDM contains mapping information on each model element unit in the model transformation of the source model into the target model. In the model transformation, the target model is generated by assigning, as a variable, each model element included in the source model to a generation template. The mapping information contained in the TDM indicates which model element in the target model each model element in the source model is related to.

Figure 4:
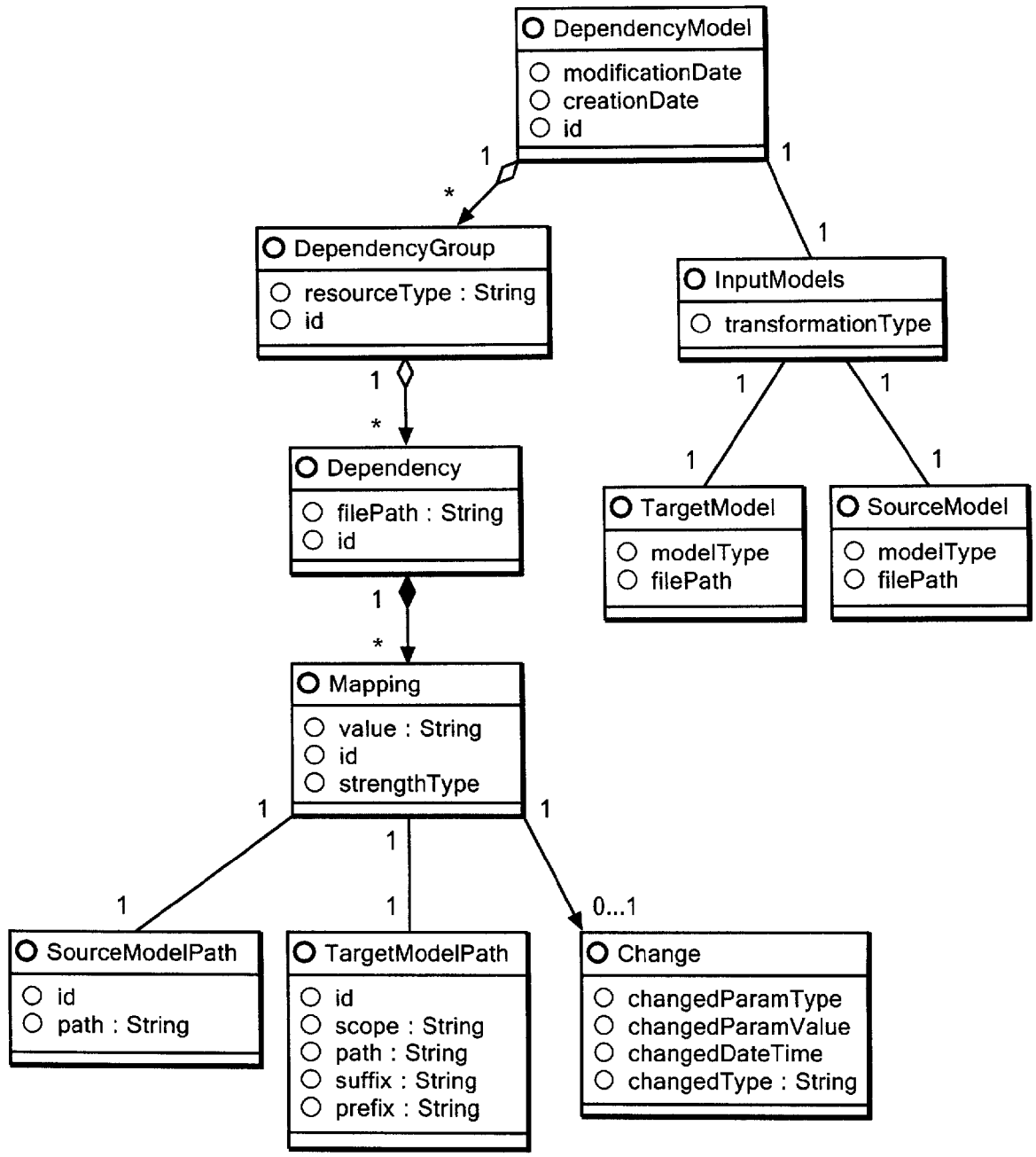
FIG. 4 is a diagram showing a meta-model of a TDM according to the embodiment of the present invention.

FIG. 4 shows a meta-model of a TDM. The TDM has a generic structure in the model transformation.

Each element and its attributes in a meta-model in a TDM will be explained below.

+DependencyModel

This element is a root element of the TDM. Generally, there is one model instance for a system developed by use of the model transformation. Instead, there can be multiple model instances in a case where a model transformation target can be divided into sub-systems.

In addition, this element has the following attributes:
 creationDate: a date when a TDM is generated (a date when the first model transformation is performed);
 modificationDate: a date when the TDM is last modified; and
 id: an ID used to identify each element when multiple DependencyModel elements exist.

+DependencyGroup

This element indicates a group of transformations each related to a Mapping element that associates one model element contained in a source model, with one model element contained in a target model. Usually, the model transformation is performed by generating a resource of a target model with a piece of information of a source model assigned to a template. For example, when the target model is source code in J2EE, source code and the like in each of DDL (Data Definition Language), JSP (JavaServer Pages) and Java are generated by using a template. Here, for example, multiple JSP files thus generated have internal expression structures that differ depending on purposes of program models. However, JSP files generated by using the same template have internal expression structures in the same format. For this reason, this element is provided to indicate a group of transformations of model elements using the same template.

Additionally, this element has the following attributes:
 resourceType: a type of file resource (JSP, source code in Java, DDL, property file, etc.); and
 id: an ID used to identify each element when multiple DependencyGroup elements exist.

+Dependency

This element indicates a dependency of each file concerning the model transformation of the source model into the target model. In other words, this element indicates a dependency of each file on another file, the files generated from the templates.

In addition, this element has the following attributes:
 filepath: a path including a file name in a file system; and
 id: an ID used to identify each element when multiple Dependency elements exist.

+Mapping

This element indicates mapping between files specified with a Dependency element, the mapping associating the source model and the target model with each other in a model element unit of the source model. This element contains a SourceModelPath element and a TargetModelPath element as child elements. Model elements connected by paths specified by the SourceModelPath element and the TargetModelPath element are associated with each other as having a dependency. For example, the mapping is carried out at a level of the methods 101 to 104 in FIGS. 2-2 and 2-3. Moreover, a change in the dependency made by the TM editor can be held as a Change element.

Moreover, this element has the following attributes:
  value: a value of a model element used in the transformation of a source model into a target model;
  id: an ID used to identify each element when multiple Mapping elements exist; and
  strengthType: a dependent strength (see below).

The dependent strength is a strength determining how much priority is given to Δ1, when Δ1 and Δ2 conflict with each other in merging. This dependent strength may be set by the system in accordance with a predetermined rule at a time of the model transformation, or may be set by the TM editor or the like after the model transformation. In addition, the dependent strength includes the following four types:

Dependent Strength H (High)
  This is a type of always prioritizing Δ1 over Δ2.
  Dependent Strength M (Medium)
  This is a type of prioritizing Δ1 over Δ2 if a model element is changed; and of prioritizing Δ2 over Δ1 if a child element of a model element is changed.
  Dependent Strength L (Low)
  This is a type of always prioritizing Δ2 over Δ1.
  Dependent Strength N (None)
  This is a type, the dependent strength of which is unknown, thereby requiring a determination by a TM editor in order to solve a conflict between Δ1 and Δ2.

+SourceModelPath
  This element indicates an absolute path of a model element in the source model.
  Moreover, this element has the following attributes:
    id: an ID used to identify each element when multiple SourceModelPath elements exist; and
    path: a path specifying a model element in the source model to be subjected to mapping (an element path in XPath and Java and the like).

+TargetModelPath
  This element indicates an absolute path of a model element in a target model. This element also can define a prefix and a suffix when the prefix and the suffix exist for a value of a model element to be subjected to mapping in the target model.
  In addition, this element includes the following attributes:
    id: an ID used to identify each element when multiple SourceModelPath elements exist;
    path: a path specifying a model element in the target model to be subjected to mapping (an element path in XPath and Java and the like);
    suffix: a suffix attached to a value of a value attribute of a Mapping element through a model transformation;
    prefix: a prefix attached to a value of a value attribute of a Mapping element through a model transformation;
    scope: a scope (see below).

The scope indicates a mapping relationship in terms of a scope employed to transform a model element in the source model into a target model. As a scope, it is possible to specify any of the following types:
  "elementOnly": this indicates only a model element in a target model; and
  "includeChildren": this indicates a model element and a child element in a target model.

Any one of the above two types can be specified by use of XPath. In addition, even in the case where a target model is source code in Java, a language structure of Java allows classes, methods, declarations and the like to be expressed by use of XML. Accordingly, the source code in Java can be expressed with Xpath, thereby allowing the scope thereof to be specified.

+Change
  In this element, a change (Δ2) in a mapping relationship made by a TM editor is recorded. In general, a change is recorded using a tool such as CVS and Subversion, and then this element is added to the TDM after it is checked that the change is related to the TDM mapping.
  Moreover, this element includes the following attributes:
    changedType: a type of change ("Update" or "Delete");
    changedParamType: a kind of an updated parameter when the type of change is "Update" (a change in the scope attribute of a TargetModelPath element, and the like);
    changedParamValue: a value of an updated parameter when the type of change is "Update"; and
    changedDateTime: a date and time of change.

+InputModels
  This element indicates models to be inputted and outputted in a model transformation, as an input model from the viewpoint of a TDM. Here, a source model and a target model are input models.
  Moreover, this element includes the following attribute:
    transformationType: a type of a used model transformation tool.

+TargetModel
  This element indicates a target model to be outputted in a model transformation.
  Moreover, this element includes the following attributes:
    modelType: a type of model (for example, XML, Java and JSP); and
    filepath: a file path of the target model in a file system.

+SourceModel
  This element indicates a source model to be inputted in a model transformation.
  Moreover, this element includes the following attributes:
    modelType: a type of a model (for example, XML, Java and JSP); and
    filepath: a file path of the source model in a file system.

Heretofore, the meta-model of the TDM has been described. Then, a specific description example of the TDM will be described below.

FIG. 5 is a description example of a TDM targeting for a J2EE application or the like. Since this example is a partial example of the TDM, only a Java file is designated as a target model. Usually, a configuration file such as a faces-config.xml as well as a JSP file are also designated as target models.

Moreover, the path to an XML-expressible resource (the source model in the case of FIG. 5), such as a UML model, is designated by use of XPath provided by the international consortium W3C that develops Web standards. In addition, the description indicating a tree structure such as "{Class}#{Method}.{Field}" can be used to designate the path to the Java file (the target model in the case of FIG. 5). A path to a JSP or HTML file can be designated as the tree structure in the same descriptive manner as described above.

In this description example of the TDM, there are two model elements targeted for mapping, and the two model elements are "Assumption" and "ItemA." The dependent strength for "Assumption" of these models is designated as H. For this reason, Δ1 is prioritized over Δ2 in merging. On the other hand, since the dependent strength for "ItemA" is designated as L, Δ2 is prioritized over Δ1 in merging.

Hereinafter, descriptions will be provided for recording Δ2 in the TDM.

Figure 6:
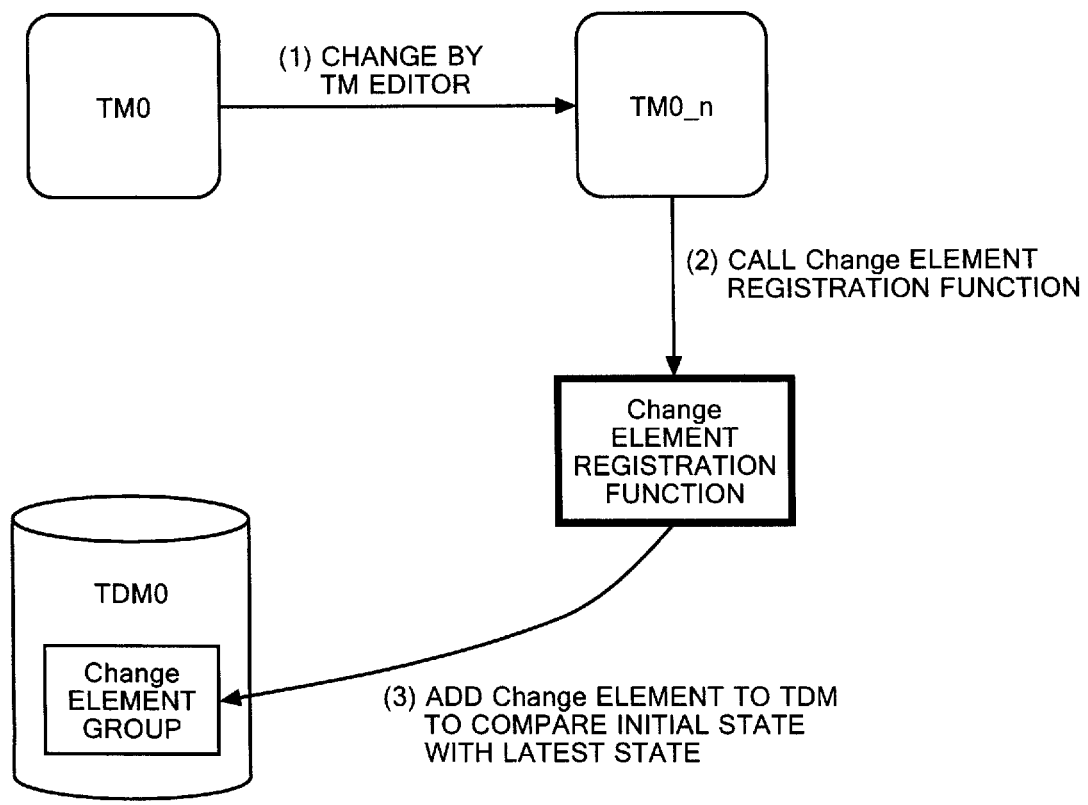
FIG. 6 is a diagram for describing registration of a Change element according to the embodiment of the present invention.

FIG. 6 is a diagram illustrating an example of a behavior in a Change element registration function. In an initial state, there are TM0 and TDM0 that is generated when TM0 is generated. In this state, TM0 is changed by a TM editor as shown by (1), so that TM0_n is generated. Then, the Change element registration function is called as shown by (2). Next, as shown by (3), a difference between the initial state and the latest state is extracted, and a Change element is generated by judging whether the extracted difference is a change relating to the mapping in the TDM, and is then added to TDM0.

Thereby, Δ2 can be automatically extracted.

Next, detailed descriptions will be given for the solving of a conflict between the differences Δ1 and Δ2 in the target model, the conflict caused by the model transformation after the change of the source model.

Figure 7:
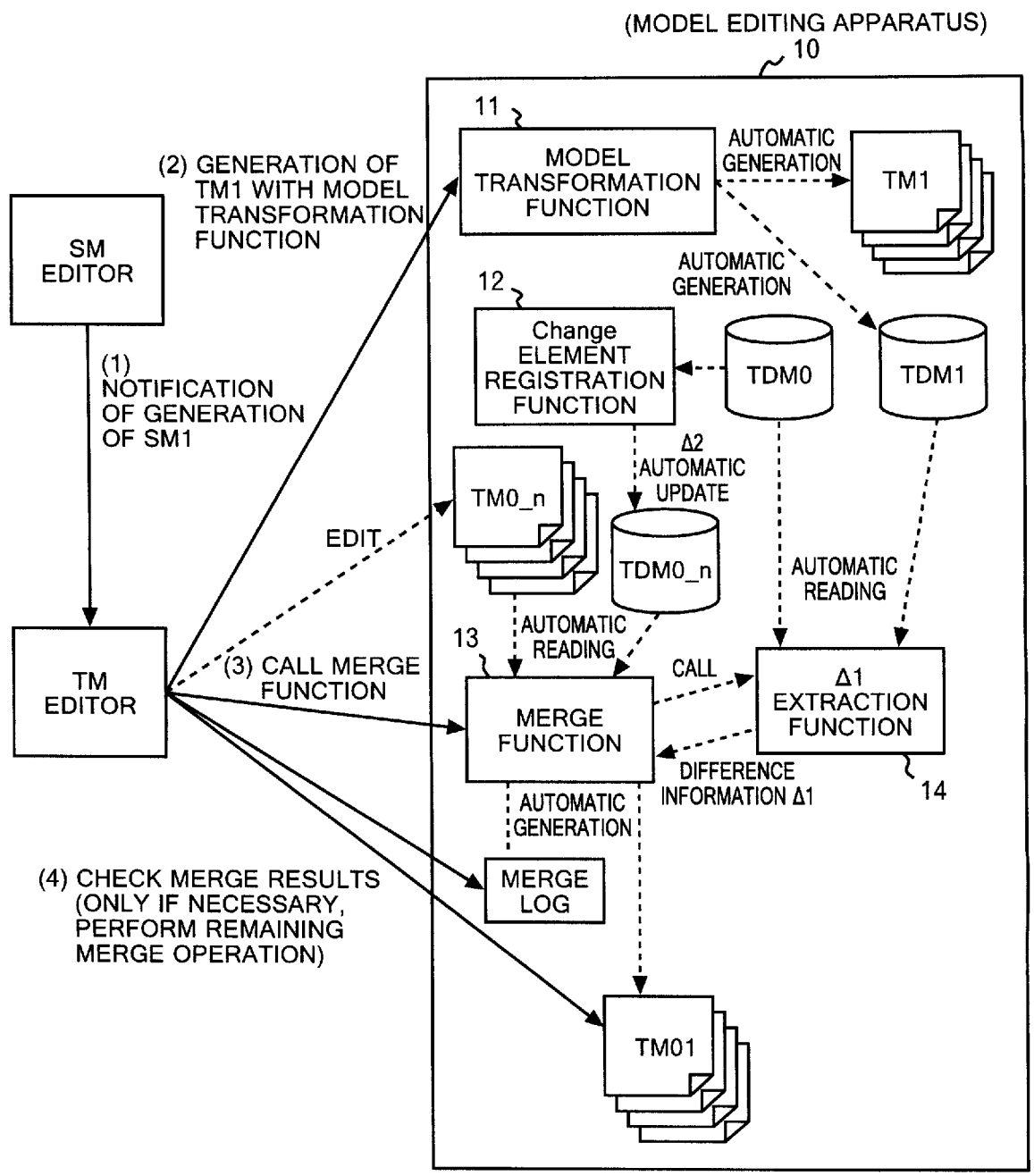
FIG. 7 is a diagram showing the flow of merge operation according to the embodiment of the present invention.

To begin with, descriptions are given for the flow of a merging operation performed by the TM editor with a model editing apparatus 10 having the model transformation function, which includes the TDM generating function shown in FIG. 3, and the Change element registration function shown in FIG. 6. FIG. 7 is a diagram showing the flow of this merging operation. In FIG. 7, the solid lines indicate the flow of an event for change management in the model transformation, and the dashed lines indicate relationships outside the flow of the event.

Here, assume that the model editing apparatus 10 holds TM0 and TDM0, and also has TM0_n that is the latest version of TM0 generated through the work of the TM editor. In addition, assume that a Change element registration function 12 constantly extracts a difference Δ2 between TM0 and TM0_n, registers the extracted difference Δ2 in TDM0, and thereby generates TDM0_n.

In this state, the SM editor changes the source model from SM0 to SM1, and notifies the TM editor of the change as shown by (1). Upon receipt of this notification, the TM editor calls a model transformation function 11 as shown by (2), and passes SM1 to the model transformation function 11. In response to this, the model transformation function 11 transforms SM1 into TM1, and generates TDM1 at the same time. Thereafter, the TM editor calls a merge function 13 as shown by (3) to merge the difference Δ1 between TM0 and TM1 and the difference Δ2 between TM0 and TM0_n. In response to this, the merge function 13 calls a Δ1 extraction function 14, and the Δ1 extraction function 14 extracts the difference Δ1 from TDM0 and TDM1, and notifies the merge function 13 of the extracted difference Δ1. Then, the merge function 13 generates TM01 and a merge log through the below-mentioned processing. Here, TM01 is a result of the merging, and the merge log is a record of the merging.

After the foregoing processing is completed, the TM editor checks the result by looking at the merge log and TM01. If TM01 requires the TM editor to perform the merge operation since the dependent strength is N, the TM editor amends TM01 in reference to the description of the merge log.

Hereinafter, functions and operations of the model editing apparatus 10 shown in FIG. 7 will be described in detail.

To begin with, operations of the Change element registration function 12 will be described. Incidentally, this description of the operations uses, as a target model, source code of an implementation level.

Figure 8:
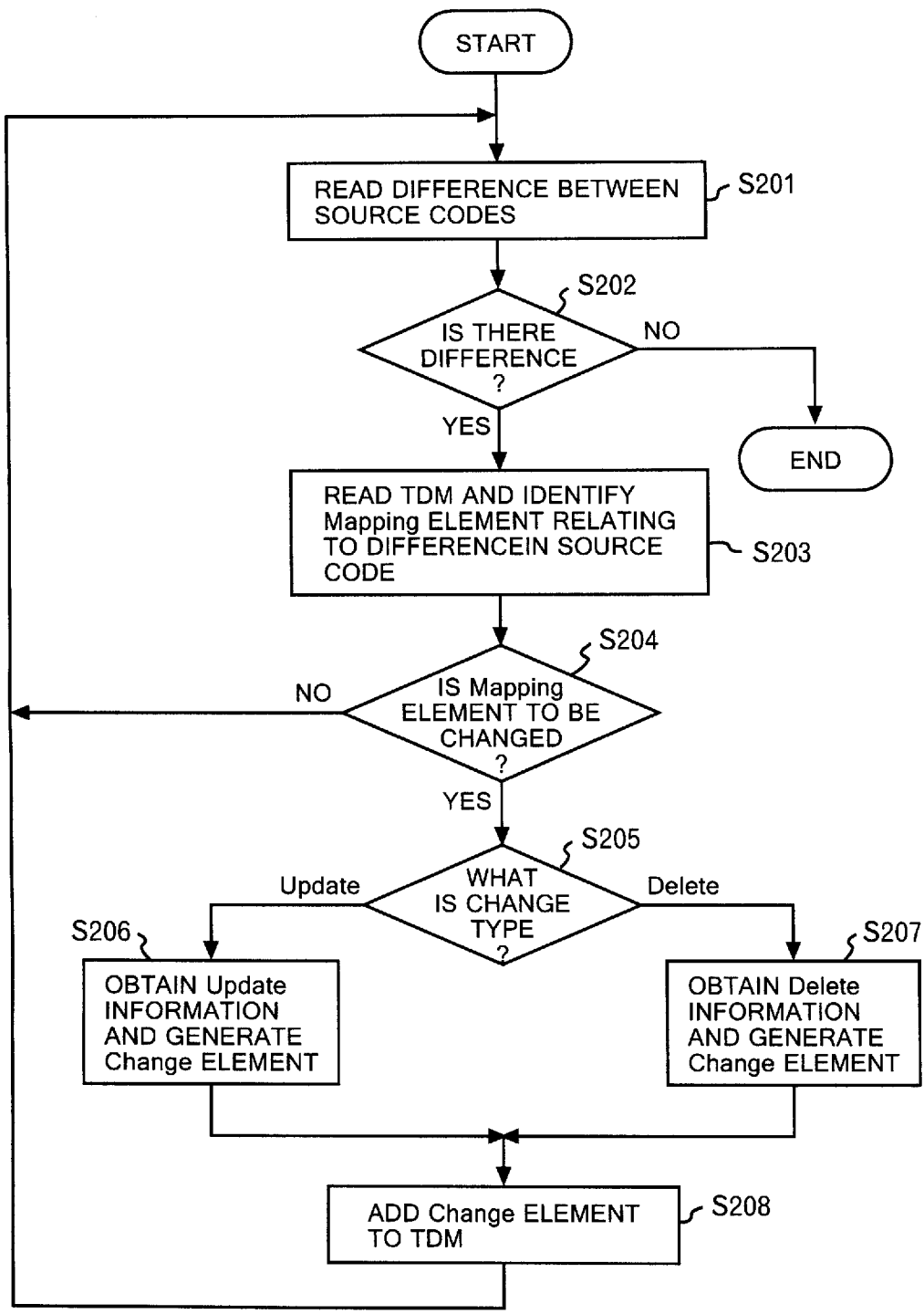
FIG. 8 is a flowchart showing operations of a Change element registration function according to the embodiment of the present invention.

FIG. 8 is a flowchart showing the operations of the Change element registration function 12.

First, the Change element registration function 12 reads a difference between the source code before the change by the TM editor, and the source code after the change by the TM editor (step 201). Then, a judgment is made as to whether or not the difference is read (step 202). When the difference is not read, the processing is terminated. When the difference is read, the Change element registration function 12 reads the TDM and identifies a Mapping element relating to the difference from among the Mapping elements included in the TDM (step 203). In other words, since the difference includes a difference not relating to the model transformation, the Change element registration function 12 excludes such a not-relating difference here.

Subsequently, the Change element registration function 12 judges whether or not the difference requires a change of the Mapping element (step 204). If the judgment result indicates that the difference does not require a change of the Mapping element, the processing returns to step 201. Thus, the Change element registration function 12 reads another difference. On the other hand, when the difference requires a change of the Mapping element, the Change element registration function 12 identifies the change type (step 205).

When the change type is "update," the Change element registration function 12 obtains information on the update (update information), and generates a Change element representing the update (step 206). In contrast, when the change type is "delete," the Change element registration function 12 obtains information on the delete (delete information), and generates a Change element representing the delete (step 207). Thereafter, the Change element registration function 12 adds the generated Change element to the TDM (step 208).

Next, a functional configuration of the merge function 13 will be described in detail.

Figure 9:
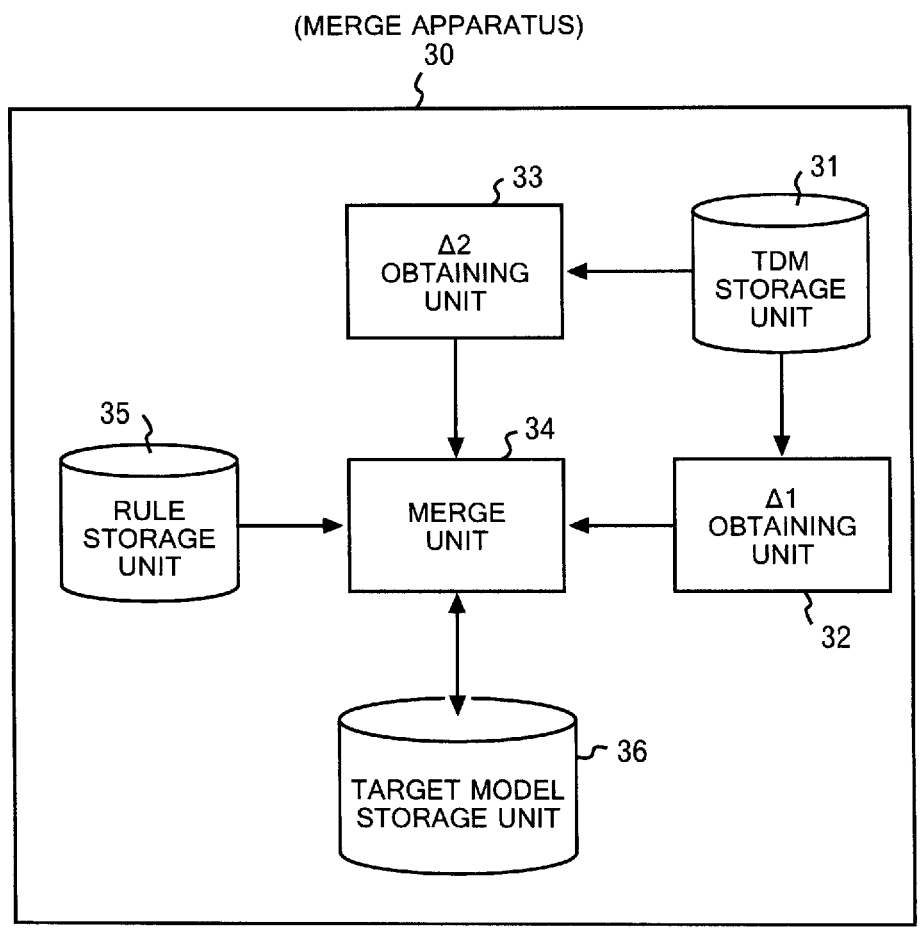
FIG. 9 is a block diagram showing a functional configuration of a merge apparatus according to the embodiment of the present invention.

FIG. 9 is a block diagram showing the functional configuration of a merge apparatus 30 in a case where the merge function 13 is implemented by using an independent apparatus as the merge apparatus 30.

The merge apparatus 30 includes a TDM storage unit 31 for storing the TDM therein, a Δ1 obtaining unit 32 for obtaining Δ1 from the TDM, and a Δ2 obtaining unit 33 for obtaining Δ2 from the TDM. Moreover, the merge apparatus 30 also includes a merge unit 34 for merging Δ1 and Δ2 together, a rule storage unit 35 for storing therein rules which are referred to in the merging, and a target model storage unit 36 for storing therein a target model in which a merge result is to be reflected.

The TDM storage unit 31 is an example of a storage unit, and stores therein the TDMs, which have been described by referring to FIGS. 4 and 5. For example, when TDM0 and TDM1 are generated through the transformations of SM0 into TM0 and SM1 into TM1, respectively, the TDM storage unit 31 stores both TDM0 and TDM1 therein. When TM0_n is generated by modifying TM0 independently, the TDM storage unit 31 also stores therein TDM0_n whose difference from TM0 is registered as a Change element. Incidentally, although this embodiment uses, as the TDM, what is written as a structured document such as an XML document, the TDM may not necessarily be such a structured document, and may be written by employing any of other formats.

The Δ1 obtaining unit 32 is an example of a first obtaining unit, and obtains Δ1 that is a difference in the target model generated by a change of the source model. As described above, this Δ1 can be obtained in a way that a TDM of the old version (for example, TDM0) and a TDM of the latest version (for example, TDM1), which are stored in the TDM storage unit 31, are compared with each other by use of an existing tool. In a case where the TDM storage unit 31 is independently provided outside the merge apparatus 30, the Δ1 obtaining unit 32 can be understood as one implementing only a function of receiving Δ1 extracted by the existing tool.

The Δ2 obtaining unit 33 is an example of a second obtaining unit, and obtains Δ2 that is a difference generated by independently changing the target model regardless of a change of the source model. As described above, this Δ2 can be obtained by extracting the Change element from the TDM stored in the TDM storage unit 31.

The merge unit 34 merges Δ1 and Δ2 together by referring to, as needed, the rules stored in the rules storage unit 35, and reflects the merge result in the target model stored in the target model storage unit 36.

In order to deal with a conflict between Δ1 and Δ2, the rule storage unit 35 stores therein multiple rules relating to the merge processing, as one example of information relating to the priorities given to Δ1 and Δ2. Here, the multiple rules can be each specified by the dependent strength that is one example of the identifier. In this embodiment, this dependent strength is set as an attribute of the Mapping element of the TDM. However, it is possible to employ another configuration in which information on the correspondence of the dependent strength with each element in the source model or information on the correspondence of the dependent strength with each element in the target model is stored in addition to the TDMs. Here, for example, there are rules to determine whether to prioritize Δ1 over Δ2 or to prioritize Δ2 over Δ1 in the merge processing. Moreover, the rule storage unit 35 may store conditions indicating a case in which Δ1 must be prioritized over Δ2, and a case in which Δ2 must be prioritized over Δ1. Specific examples will be given later for these rules.

The target model storage unit 36 stores therein the target model before the merge result is reflected, and the target model after the merge result is reflected. In the example described by referring to FIG. 7, the former target model is TM0_n, and the latter target model is TM01.

Here, the content stored in the rule storage unit 35 is described in detail.

FIGS. 10A to 10D show processing patterns in merging in which Δ1 and Δ2 conflict with each other. Accordingly, the tables in FIGS. 10A to 10D are referred to as "processing pattern tables." FIGS. 10A to 10D show the processing patterns for the respective dependent strengths.

FIG. 10A is a processing pattern table in the case of the dependent strength H. As mentioned above, in the case of the dependent strength H, Δ1 is prioritized over Δ2. Accordingly, the processing pattern according to such priority is defined.

FIG. 10B is a processing pattern table in the case of the dependent strength M. As mentioned above, in the case of the dependent strength M, Δ1 is prioritized over Δ2 if a model element is changed, and Δ2 is prioritized over Δ1 if a child element of the model element is changed. Accordingly, the processing pattern according to such priority is defined.

FIG. 10C is a processing pattern table in the case of the dependent strength L. As mentioned above, in the case of the dependent strength L, Δ2 is prioritized over Δ1. Accordingly, the processing pattern according to such priority is defined.

In the aforementioned way, the priority between Δ1 and Δ2 is determined in advance for each of the dependent strengths H, M and L. Thereby, automatic processing can be carried out by use of the distinctive features of the respective dependent strengths.

In contrast, FIG. 10D is a processing pattern table in the case of the dependent strength N. As mentioned above, in the case of the dependent strength N, the priority between Δ1 and Δ2 is unknown. Accordingly, it is defined that the conflict requires the merge processing to be operated by a TM editor. Note that, in an actual development using a model driven architecture, it is desirable to reduce the number of the designated dependent strengths N as much as possible by collecting data from the course of the development. In this case, the data can be collected from the course of the development in a way that the SM editor and the TM editor determine the data on the basis of every merge log outputted by use of a log function and the like.

The merging by using the dependent strength in the foregoing way makes it possible to merge changes in the model-driven development, while the conventional technique fails to achieve such merging.

Then, operations of the merge apparatus 30 will be described.

Figure 11:
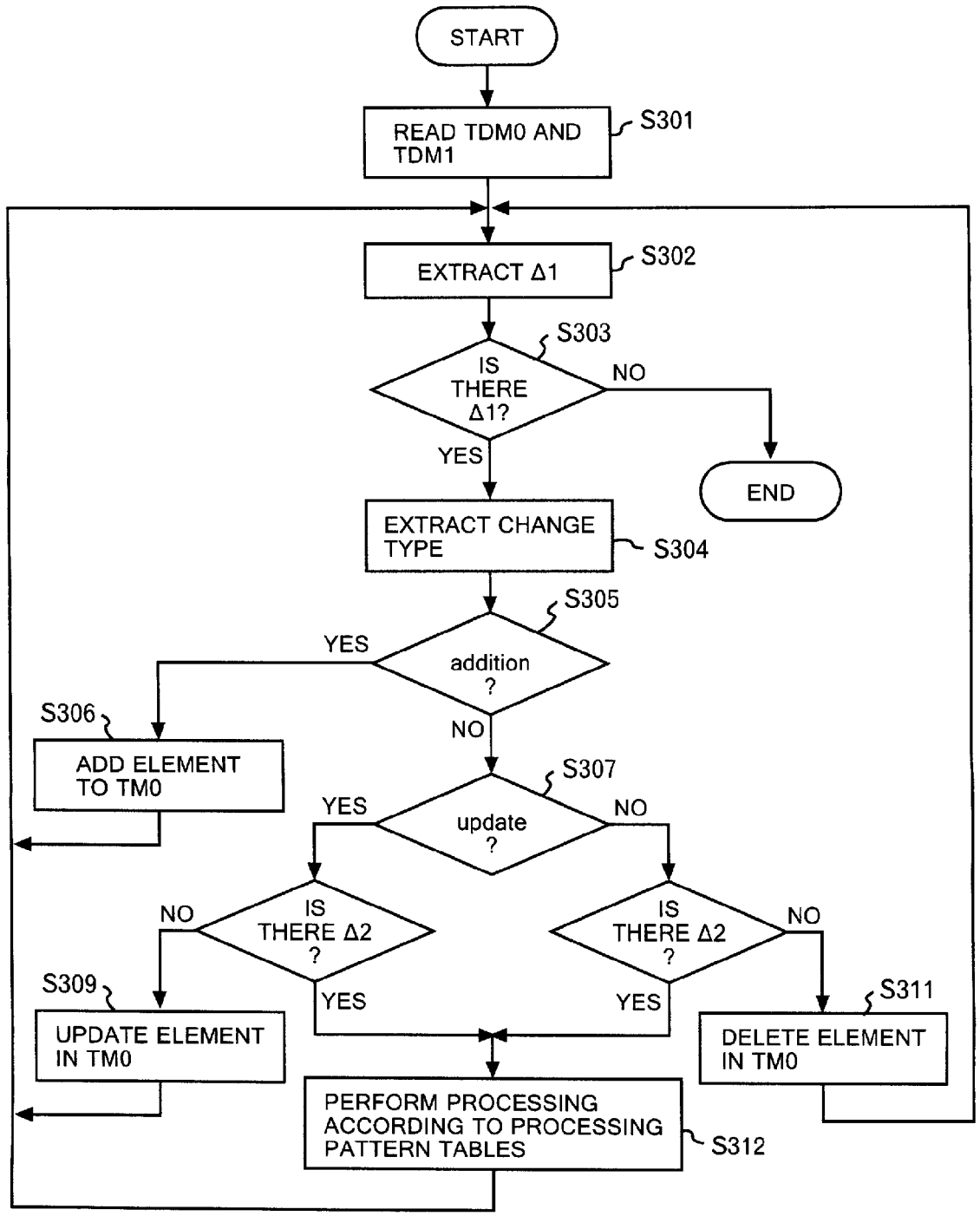
FIG. 11 is a flowchart showing operations of the merge apparatus according to the embodiment of the present invention.

FIG. 11 is a flowchart of the operations of the merge apparatus 30. Here, consider a case where SM0 and SM1 are transformed into TM0 and TM1, respectively. Then, it is assumed to merge Δ1 and Δ2 together in this case, when Δ1 is a difference between TM0 and TM1, and when Δ2 is a difference caused by an independent change in TM0.

Firstly, the Δ1 obtaining unit 32 reads TDM0 and TDM1 from the TDM storage unit 31 (step 301). Then, one difference Δ1 is extracted by use of a difference extraction tool, for example, such as an XML Diff tool (step 302). Thereafter, a judgment is made as to whether or not Δ1 is extracted (step 303). If Δ1 is not extracted here, the processing is terminated. If Δ1 is extracted, the Δ1 obtaining unit 32 passes Δ1 to the merge unit 34, and the merge unit 34 extracts the change type of Δ1 (step 304).

Here, the change type of Δ1 includes "Addition," "Update" and "Delete."

For this reason, the merge unit 34 firstly judges whether or not the change type of Δ1 is "Addition" (step 305). If the change type is "Addition," the merge unit 34 adds Δ1, as it is, to TM0 (TM0_n) (step 306). This addition is based on the premise that the importance of a change in a higher model is higher than that in a lower model, since the lower model is generated based on the information on the higher model in the Model Driven Architecture. After that, returning to step 302, the processing for the next Δ1 starts.

In contrast, when it is judged that the change type of Δ1 is not "Addition" in step 305, the merge unit 34 judges whether or not the change type of Δ1 is "Update" (step 307). If the change type is "Update," the control is passed from the merge unit 34 to the Δ2 obtaining unit 33. Then, the Δ2 obtaining unit 33 judges whether or not there is Δ2 (step 308). More precisely, the Δ2 obtaining unit 33 judges whether or not there is a Change element as a child element of the Mapping element relating to Δ1. When the judgment result indicates the absence of the Change element, the element in TM0 (TM0_n) is updated according to Δ1 (step 309). Then, returning to step 302, the processing for the next Δ1 starts.

Alternatively, when it is judged in step 307 that the change type of Δ1 is not "Update" either, the change type is "Delete." For this reason, the control is passed from the merge unit 34 to the Δ2 obtaining unit 33, and the Δ2 obtaining unit 33 judges whether or not there is Δ2 (step 310). More precisely, the Δ2 obtaining unit 33 judges whether or not there is a Change element as a child element of the Mapping element relating to Δ1. When the judgment result indicates the absence of the Change element, the element in TM0 (TM0_n) is deleted according to Δ1 (step 311). Then, returning to step 302, the processing for the next Δ1 starts.

On the other hand, when it is judged that there is Δ2 in steps 308 and 310, Δ1 and Δ2 conflict with each other for the same element. In this case, the processing is performed according to the processing pattern tables described by referring to FIGS. 10A to 10D (step 312).

Here, descriptions will be given for a case where the processing moves from step 308 to step 312.

In this case, the change type of Δ1 is "Update." Accordingly, here, consider what kinds of processing are carried out against Δ1 when the change types of Δ2 are "Update" and "Delete."

In the case of the dependent strength H, if the change type of Δ2 is "Update," Δ2 is invalidated and the element in TM0 (TM0_n) is updated according to Δ1. Instead, if the change type of Δ2 is "Delete, " the deleted element has to be restored. For this reason, the deleted element is added to TM0 (TM0_n) according to Δ1.

In the case of the dependent strength M, if the change type of Δ2 is "Update," no operation is performed. Instead, if the change type of Δ2 is "Delete," the deleted element has to be restored. For this reason, the deleted element is added to TM0 (TM0_n) according to Δ1.

In the case of the dependent strength L, no operation is performed.

In the case of the dependent strength N, for example, a dialogue box or the like is displayed, thereby prompting the TM editor to operate the merge processing.

Here, descriptions will be given for a case where the processing moves from step 310 to step 312.

In this case, the change type of Δ1 is "Delete." Accordingly, here, consider what kinds of processing are carried out against Δ1 when the change types of Δ2 are "Update" and "Delete."

In the case of the dependent strength H, if the change type of Δ2 is "Update," the element in TM0 (TM0_n) is deleted according to Δ1. Instead, if Δ2 is "Delete," no operation is performed.

In the case of the dependent strength M, if the change type of Δ2 is "Update," the element in TM0 (TM0_n) is deleted according to Δ1. Instead, if Δ2 is "Delete," no operation is performed.

In the case of the dependent strength L, no operation is performed.

In the case of the dependent strength N, if the change type of Δ2 is "Update," a dialogue box or the like is displayed, thereby prompting the TM editor to operate the merge processing. Instead, if the change type of Δ2 is "Delete," no operation is performed.

Figure 12:
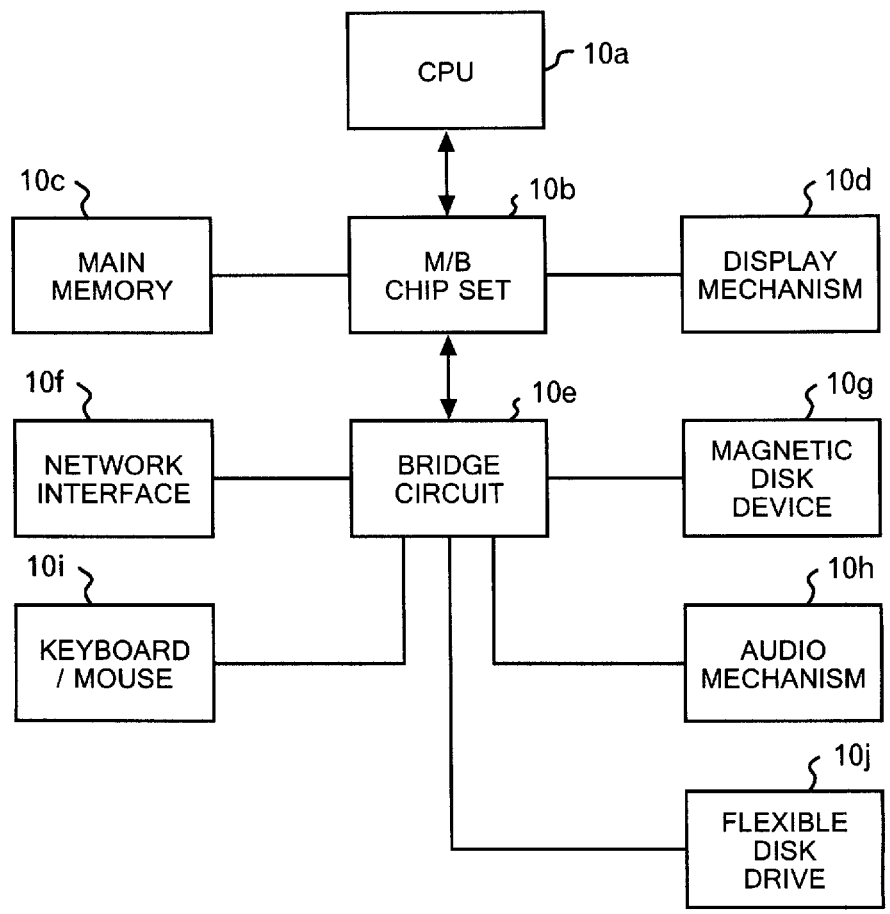
FIG. 12 is a diagram showing a hardware configuration to which the embodiment of the present invention is applicable.

Lastly, descriptions will be given for a hardware configuration of a preferable computer to which this embodiment is applied. FIG. 12 is a diagram showing an example of the hardware configuration of such a computer. As shown in FIG. 12, the computer includes a CPU (central processing unit) 10*a* as computing means, an M/B (mother board) chip set 10*b*, a main memory 10*c* and a display mechanism 10*d*. The main memory 10*c* and the display mechanism 10*d* are connected to the CPU 10*a* via the M/B (mother board) chip set 10*b*. Moreover, the M/B chip set 10*b* is connected to a network interface 10*f*, a magnetic disk device (HDD) 10*g*, an audio mechanism 10*h*, a keyboard/mouse 10*i* and a flexible disk drive 10*j* via a bridge circuit 10*e*.

In FIG. 12, each configuration element is connected through a bus. For example, via CPU buses, the CPU 10*a* is connected to the M/B chip set 10*b*, and the M/B chip set 10*b* is connected to the main memory 10*c*. The M/B chip set 10*b* may be connected to the display mechanism 10*d* via an AGP (accelerated graphics port). When the display mechanism 10*d* includes a video card supporting PCI Express, the M/B chip set 10*b* is connected to the video card via a PCI Express (PCIe) bus. In addition, for example, a PCI Express bus can be used to connect the bridge circuit 10*e* to the network interface 10*f*. Moreover, for example, serial ATA (AT Attachment), parallel ATA or PCI (Peripheral Components Interconnect) can be used to connect the bridge circuit 10*e* to the magnetic disk device 10*g*. Then, the bridge circuit 10*e* is connected to each of the keyboard/mouse 10*i* and the flexible disk drive 10*j* by use of USB (universal serial bus).

Here, the entire present invention can be implemented only as hardware or as software. Instead, the present invention also can be implemented by using both hardware and software. In other words, the present invention can be implemented as a computer, a data processing system, and a computer program. This computer program can be provided while being stored in computer readable media. Here, a possible medium is an electric, magnetic, optical, electromagnetic, infrared or semiconductor system (an apparatus or instrument) or a propagation medium. In addition, a semiconductor or solid state storage device, a magnetic tape, a removable computer diskette, a random access memory (RAM), a read-only memory (ROM), a rigid magnetic disk and an optical disk are cited as examples of the computer readable media. Current examples of the optical disk include a compact disk-read-only memory, (CD-ROM), a compact disk read/write (CD-R/W) and a DVD.

As described above, in this embodiment, the TDM is generated at the time of the model transformation, and the information on the mapping between the source model and the target model is held. In this way, it enables support for the management of changes concerning Δ1 and Δ2 by use of a tool. When the mapping information on the TDM is unavailable, the target model is changed while a relationship between Δ2 and the source model is unknown. However, according to this embodiment, such relationship can be maintained.

Moreover, in this embodiment, use of the merge function using the TDM for which the dependent strengths are defined, leads to a reduction of the merge operation by the TM editor as compared with the conventional case. If correct dependent strengths can be defined in advance, the merge operation by the TM editor can be eliminated, the merge operation otherwise required for the conflict part.

Thus, according to this embodiment, it is possible to achieve time reduction and quality improvement in change management work in a model-driven development.

According to the present invention, a change in a target model attributed to an update of a source model and an independent change of the target model can be efficiently merged.

Although the present invention has been described above by using the embodiment, the technical scope of the present invention is not limited to the above embodiment. It is obvious to those skilled in the art that it is possible to modify the embodiment in various ways and to employ various alternative embodiments without deviating from the sprit and scope of the present invention.

The invention claimed is:

1. An apparatus for supporting model-driven development, comprising:
 a first obtaining unit for obtaining first change information on a first change from among changes made between a first target model generated based on a first source model and a second target model generated based on a second source model in the model-driven development, the first change attributed to an update of the first source model to generate the second source model;
 a second obtaining unit for obtaining second change information on a second change from among the changes made directly in the first target model to generate a third target model corresponding with the first source model, the second change not attributed to the update of the first source model; and
 a merge unit for merging the first change information and the second change information according to presorted information on priority between the first change and the second change.

2. The apparatus according to claim 1, further comprising a storage unit for storing a first structured document and a second structured document therein, the first structured document indicating a correspondence relationship between an element in the first source model before the update of the first source model and an element in the first target model, the second structured document indicating a correspondence relationship between the element in the second source model after the update of the first source model and the element in the second target model, wherein the first obtaining unit obtains, as the first change information, a difference between the first structured document and the second structured document.

3. The apparatus according to claim 1, further comprising a storage unit for storing a correspondence relationship among a first element constituting the first source model, a second element constituting the third target model, and a third element indicating a change of the second element, wherein the second obtaining unit obtains the second change information by extracting the third element from the correspondence relationship.

4. The apparatus according to claim 1, wherein the information on the priority includes a condition for prioritizing the first change over the second change in merging.

5. The apparatus according to claim 1, wherein the information on the priority includes information indicating a command to inquire of a user whether or not to prioritize the first change over the second change in merging.

6. The apparatus according to claim 1, wherein
the information on the priority includes a plurality of rules relating to merge processing, and
the plurality of rules are each specified by an identifier.

7. The apparatus according to claim 6, further comprising a storage unit for storing therein information on a correspondence of each element constituting the third target model and the second target model to the identifier, wherein according to a rule specified by the identifier, the merge unit merges change information on a change of the element in the first change information, and change information on a change of the element in the second change information.

8. A method for supporting model-driven development, comprising the steps of:
transforming a first source model into a first target model;
generating a second source model by updating the first source model;
transforming the second source model into a second target model;
obtaining first change information on a first change made between the first target model and the second target model;
generating a third target model by independently and directly changing the first target model regardless of the update of the first source model;
obtaining second change information on a second change made between the first target model and the third target model; and
merging the first change information on the first change and the second change information on the second change according to prestored information on priority between the first change and the second change.

9. The method according to claim 8, wherein the information on the priority includes a condition for prioritizing the first change over the second change in merging.

10. A non-transitory computer readable storage medium storing a computer program which, when processed by a computer, causes the computer to implement a method of supporting model-driven development, the method comprising:
obtaining first change information on a first change from among changes made between a first target model generated based on a first source model and a second target model generated based on a second source model in the model-driven development, the first change attributed to an update of the first source model to generate the second source model;
obtaining second change information on a second change from among the changes made directly in the first target model to generate a third target model corresponding with the first source model, the second change not attributed to the update of the first source model; and
merging the first change information and the second change information according to prestored information on priority between the first change and the second change.

11. The non-transitory computer readable storage medium according to claim 10, wherein the information on the priority includes a condition for prioritizing the first change over the second change in merging.

12. The non-transitory computer readable storage medium according to claim 10, wherein the information on the priority includes information indicating a command to inquire of a user whether or not to prioritize the first change over the second change in merging.

13. The non-transitory computer readable storage medium according to claim 10, wherein
the information on the priority includes a plurality of rules relating to merge processing, and
the plurality of rules are each specified by an identifier.

14. The non-transitory computer readable storage medium according to claim 13, wherein
from a certain storage unit, the merge unit reads information on a correspondence of each element constituting the third target model and the second target model to the identifier, and
according to a rule specified by the identifier, the merge unit merges change information on a change of the element in the first change information, and change information on a change of the element in the second change information.

* * * * *